United States Patent Office 3,417,311
Patented Dec. 17, 1968

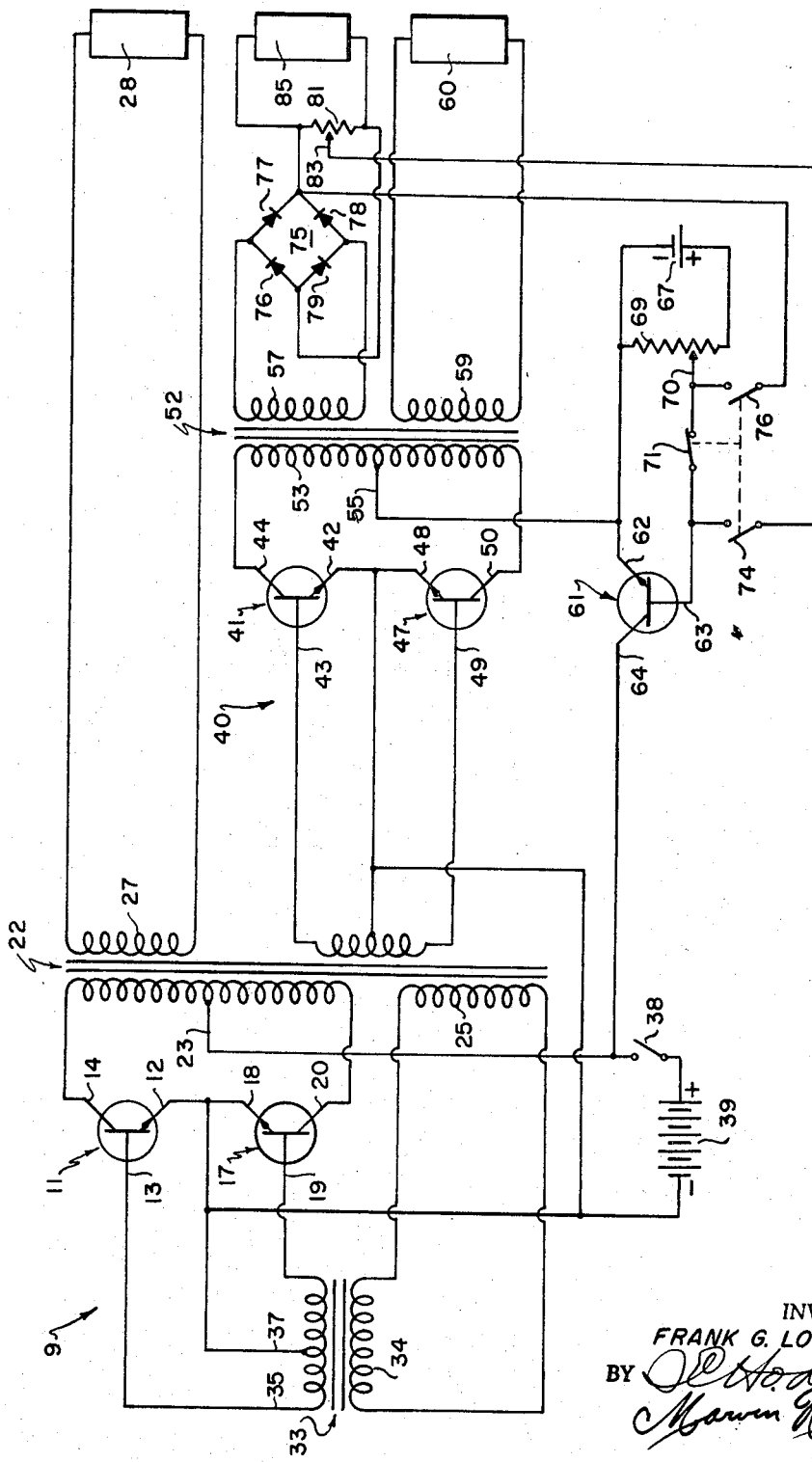

3,417,311
STATIC CONVERTER WITH LOAD POTENTIAL CONTROL
Frank G. Logan, Bowie, Md., assignor to the United States of America as represented by the Secretary of the Navy
Filed Jan. 28, 1966, Ser. No. 523,802
2 Claims. (Cl. 321—2)

ABSTRACT OF THE DISCLOSURE

A source of D.C. voltage fed via a potentiometer to a control transistor provides control of reference voltage for a transistor amplifier transformer-coupled to a prior oscillator stage and to an output stage. The voltage/current of the output may be varied without affecting oscillator characteristics including frequency.

---

The invention described herein may be manufactured and used by or for the Government of the United States of America for governmental purposes without the payment of any royalties thereon or therefor.

The present invention relates to an inverter for converting a direct current voltage to an alternating current voltage and more particularly to a converter which is capable of supplying a variable amount of direct current voltage and a variable amount of alternating current voltage.

The desirability of converting a direct current voltage of a first value to an alternate current voltage or direct current voltage of a second value has been established. Very briefly, voltage converters have been used as power supplies for electronic equipment or the like whenever the available voltage is not suited for operating the electrical equipment. However, the prior art voltage converters generally do not have a variable voltage output. Nor do variable voltage converters of prior art produce both an alternate current voltage and a direct current voltage simultaneously without the use of further converters.

The present invention accomplishes the aforementioned desired function by providing a voltage converter which utilizes a transistor to control the output of the converter from zero to a maximum value. Additionally the circuit to be described is adapted to provide a constant voltage output which may be preset at any desired level within the capabilities of the converter.

An object of the invention is to provide a voltage converter which converts a direct current voltage to a variable alternating current voltage.

A further object of the invention is to provide a high efficiency voltage converter which converts a first direct current voltage to a variable direct current voltage having a greater or lesser value than the first direct current voltage.

Another object of the invention is to provide a high efficiency voltage converter which converts a first direct current voltage to a regulated variable direct current voltage having a greater or lesser value than the first direct current voltage.

Still another object of the invention is to provide a voltage converter which converts a direct current voltage to a regulated variable alternating current voltage.

Other objects and many of the attendant advantages of this invention will be readily appreciated as the same becomes better understood by reference to the following detailed description when considered in connection with the accompanying drawings wherein:

The sole figure is a circuit diagram of a voltage converter which is constructed in accordance with the invention.

Referring to the sole figure a free runing oscillator 9 is provided which contains a first transistor 11 having an emitter electrode 12, a base electrode 13 and a collector electrode 14. A transistor 11 and a transistor 17 are shown as being of the NPN type, however, these transistors may be of the PNP type. The transistor 17 contains an emitter electrode 18, a base electrode 19 and a collector electrode 20. The emitter electrode 12 of transistor 11 is connected to the emitter electrode 18 of transistor 17.

A transformer 22 has one end of a center tapped primary winding 23 connected to the collector electrode 14 of transistor 11 and its other end connected to the collector electrode 20 of the transistor 17. A battery 39 has its negative electrode connected to the emitter electrode 12 of the transistor 11 and emitter electrode 18 of transistor 17 and its positive terminal connected to the center tap of the primary winding 23 of the transformer 22. A secondary winding 35 having a center tap 37 of transformer 33 has one of its ends connected to the base electrode 13 of the transistor 11 and its other end connected to the base electrode 19 of the transistor 17. The center tap 37 of the secondary winding 35 is connected to the emitter electrode 18 of the transistor 17. A secondary winding 25 of the transformer 22 has one of its ends connected to the primary winding 34 of the transformer 33 and the other end of the secondary winding 25 is connected to the other end of the primary winding 34 of the transformer 33. The secondary winding 27 of the transformer 22 has a load 28 connected thereacross.

An amplification stage 40 contains a first transistor 41 of the NPN type having an emitter electrode 42, a base electrode 43 and a collector electrode 44 and a second NPN transistor 47 having an emitter electrode 48, a base electrode 49 and a collector electrode 50. Transistors 41 and 47 may be of PNP type if desired. The emitter electrode 42 of the transistor 41 is directly connected to the emitter electrode 48 of the transistor 47. A primary winding 53 having a center tap 55 of the transformer 52 has one of its ends connected to the collector electrode 44 of the transistor 41 and its other end connected to the collector electrode 50 of the transistor 47. The base electrode 43 of the transistor 41 is connected to one end of the secondary winding 29 of the transformer 22. The other end of the secondary winding 29 of the transformer 22 is connected to the base electrode 49 of the transistor 47. A center tap 31 of the secondary winding 29 is connected to the emitter electrode 42 of the transistor 41 and the emitter electrode 48 of the transistor 47. The center tap 31 of the secondary winding 29 is also connected to the negative terminal of the battery 39.

The center tap 55 of the primary winding 53 is connected to the emitter 62 of a control transistor 61. The control transistor 61 is also provided with a base electrode 63 and a collector electrode 64 which is connected to the positive terminal of battery 39. The emitter electrode 62 of the transformer 61 is connected to one end of a potentiometer 69 and to the negative terminal of battery 67. The battery 67 has its positive terminal connected to the other end of a potentiometer 69 having a center tap 70. The potentiometer 69 is of a variable resistance having a movable center tap 70 which is connected to the base electrode 63 of the transistor 61.

Transformer 52 is provided with a secondary winding 57 which has one of its ends connected to the cathode of diode 76 of the rectifying network 75. The other end of the secondary winding 57 is connected to the cathode of diode 79 of the rectifying network 75. The anode of diode 76 is connected to the anode of diode 79. The cathode of diode 77 is connected to the cathode of diode 78. The cathode of diode 76 is connected to the anode of diode 77 and the cathode of diode 79 is connected to the anode of diode 78. A load 85 has one of its ends connected to the junction of the cathodes of diodes 77 and 78. And its other end to the junction of the anodes of diodes 76 and 79. A center tap potentiometer 80 has both of its ends connected across the load 85. The center tap 83 of the potentiometer 81 is connected to switch 74. The cathodes of the diodes 77 and 78 are connected to the switch 76. It is to be noted that the switches 74 and 76 are open when the switch 71 is closed. The base electrode 63 of the transistor 61 is connected to the movable center tap 70 of the potentiometer 69, however, when the switch 71 is open and switches 74 and 76 are closed (shown in dash lines) the center tap 83 of the potentiometer 81 is connected to the base 63 of the control transistor 61 and the former connection between the base electrode 63 of control transistor 61 and the center tap 70 of the potentiometer 69 is broken. When the switches 76 and 74 are closed the center tap 70 of the potentiometer 69 is in series with the center tap 83 of the potentiometer 81 so that the voltage drop due to the battery 67 and the output of the rectifying network 75 is of opposite polarities. A means is provided for supplying an alternating current voltage output which comprises the secondary winding 59 of the transistor 52 which is connected to an output load 60.

The operation of the invention is as follows:

When the switch 38 is closed the battery 39 is connected to the oscillator 9 and the amplifier 40 which causes the oscillator 9 to be oscillating thereby producing a square wave output. Assuming that the transistor 11 is the first to become conductive then, it remains conductive as long as the core of the transformer 22 continues to increase its magnetization in a given direction. After the transformer has saturated, the electric field generated by the saturating field ceases thereby causing the conducting transistor 11 to cut off. The transistor 17 begins to conduct thereby causing the core of the transformer 22 to become magnetized in the opposite direction. The resulting change of magnetization in the transformer core induces a voltage in the secondary winding 25 that keeps the conductive transistor 17 in a high conductive state until the core saturates in the opposite direction. After the core saturates in the opposite direction then transistor 11 becomes conductive and transistor 17 becomes non conductive. Transistors 11 and 17 are switched to the high conductive state alternately and the circuit oscillates at a frequency which is proportional to the battery voltage 39. A more detailed description of the oscillator 9 is described by G. H. Royer in the AIEE Transactions, vol. 74, Part I, pages 322–327, 1955.

The amplifier 40 is a push-pull type transistorized amplifier wherein the positive going half of a signal developed across the secondary winding 29 is amplified by the transistor 41 and the negative going cycle is amplified by the transistor 47. The control transistor 61 controls the amount of B+ supply for amplifier 40 and therefore controls the amount of the amplification of the transistors 41 and 47. When the potentiometer 70 is moved closer to the negative terminal of the battery 67 then the conductivity of the transistor 61 tends to decrease and thereby presents a smaller amount of B+ potential through the center tap of the transformer 55. Conversely when the center tap 70 is moved towards the positive terminal of the battery 67 then the conductivity of the transistor 61 increases thereby increasing the B+ potential presented to the center tap 55 of the transformer 53. By increasing the amount of B+ potential supplied to the transistors 41 and 47 the amount of amplification is thusly increased. When the center tap 70 is connected all the way down to the negative terminal of the battery 67 then the transistor 61 is cut off and there is substantially no amplification in the transistors 41 and 47 thereby presenting a zero voltage output to the loads 60 and 85. When the potentiometer's center tap 70 is at the positive terminal of the battery 67 then the transistor 61 is in its maximum conductive state thereby developing the maximum amplification in transistors 41 and 47. When the transistors 41 and 47 are in their maximum amplification state the loads 85 and 60 receive their maximum voltage. In this way the voltage placed on loads 60 and 85 can be continuously varied from a minimum value to a maximum value.

When it is desired to have the voltage converter operated in its regulated voltage state, then the switch 71 is opened and the switches 74 and 76 are closed thereby connecting the base electrode 63 of the transistor 61 to the center tap 83 of potentiometer 81 and the center tap 70 to the cathodes of diodes 77 and 78. The voltage detected by the potentiometer 81 and picked off the center tap 83 is such that it subtracts from the voltage on the center tap 70 of the potentiometer 69 when they are connected in series. Potentiometers 81 and 69 have their center taps so adjusted that the desired output voltage is placed upon the loads 85 or 60. As the voltage at the loads changes so does the voltage drop across the resistor 81. If the voltage drop across the resistor 81 tends to increase then the signal presented between the switches 74 and 76 is in such a direction as to reduce the bias on the base of the transistor 63 of the control transistor 61 thereby decreasing its conductivity. As the conductivity of the transistor 61 decreases so does the amplification of the transistor 41 and 47 thereby tending to present a smaller output across the secondary winding 57 and 59 of the transformer 52. This action continues until the balance is achieved at which point it stops. However, if the converse happens and the voltage tends to fall below the given set point then the voltage change across the switches 74 and 76 is such that it tends to bias the base electrode 63 of the transistor 61 into a higher state of conduction thereby supplying more bias current for the center tap 55. As more bias is supplied the center tap 65 the amplification of transistor 41 and 47 increases. Thusly inducing a greater voltage across the secondary windings 57 and 59 of the transformer 52 thereby returning the potential across the output loads 85 and 60 to their preset levels.

Obviously many modifications and variations of the present invention are possible in the light of the above teachings. It is therefore to be understood that within the scope of the appended claims the invention may be practiced otherwise than as specifically described.

What is claimed is:

1. A converter for delivering at its output a variable electrical quantity without deleterious effects on waveform characteristics comprising:

a source of direct current;

oscillator means having an output stage including a first transformer, said oscillator means being coupled to said source of direct current for producing an alternating current waveform in the secondary of said first transformer;

means for producing a D.C. voltage including means to vary the level of said voltage;

an output transformer;

push pull amplifier means comprising first and second transistors each having a base, collector and emitter, the respective bases being connected to opposite ends of the secondary of the first transformer the emitters being connected to a centertap of the secondary of the first transformer, and the respective collectors being connected to opposite ends of the primary of the output transformer;

a control transistor having a base, emitter and collector, the base being connected to said means for producing a D.C. voltage, the collector being connected to said source of direct current and the emitter being connected to a centertap of the primary of said output transformer thereby controlling the conduction of said control transistor;

rectifier means coupled in circuit with the secondary of the output transformer; and switch means connected in circuit with said rectifier means, with said source of D.C. voltage and with the base of said control transistor for selectively connecting the rectifier means and said source of D.C. voltage in circuit with said base.

2. The converter according to claim 1 wherein said means for producing a D.C. voltage comprises an independent source of direct current.

References Cited

UNITED STATES PATENTS

| | | | |
|---|---|---|---|
| 2,720,622 | 11/1955 | Deuser | 321—2 X |
| 2,806,963 | 9/1957 | Woll. | |
| 2,987,664 | 6/1961 | Poirier et al. | 321—2 |
| 3,230,382 | 1/1966 | Burns et al. | 307—11 |
| 3,320,510 | 5/1967 | Locklair | 321—2 |
| 3,327,199 | 6/1967 | Gardner et al. | 321—2 |
| 3,337,787 | 8/1967 | Joseph | 321—2 |

FOREIGN PATENTS 1,190,868 4/1959 France.

JOHN F. COUCH, *Primary Examiner.*

W. H. BEHA, Jr., *Assistant Examiner.*

U.S. Cl. X.R.

321—16; 330—10